Figure 1:
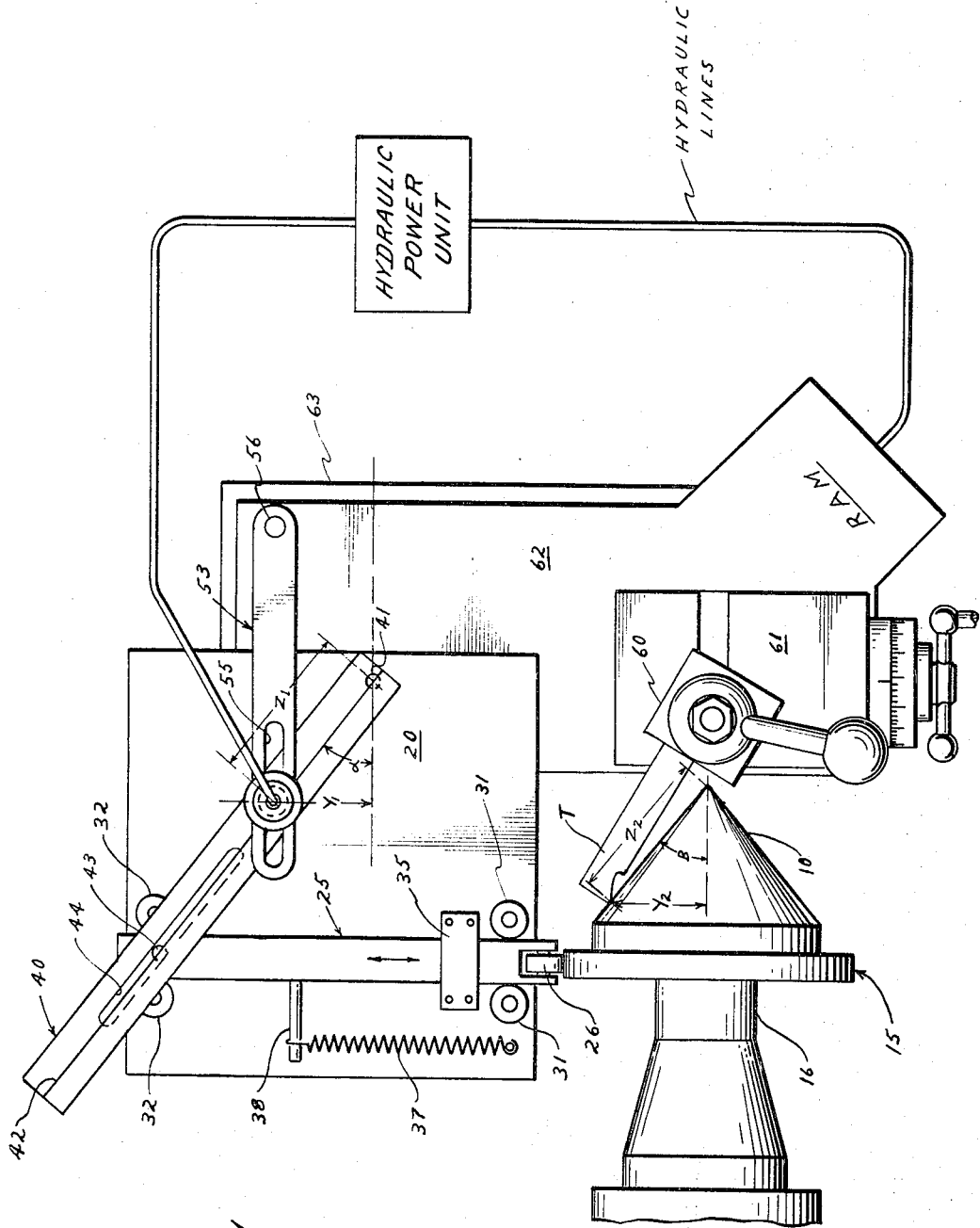

March 19, 1968 J. H. ALLEN, SR., ETAL 3,373,640
APPARATUS FOR MACHINING GEOMETRIC CONES
Filed Dec. 28, 1965 2 Sheets-Sheet 2

John H. Allen, Sr.
Orrin A. Wobig
INVENTORS

BY
ATTORNEYS

United States Patent Office 3,373,640
Patented Mar. 19, 1968

3,373,640
APPARATUS FOR MACHINING
GEOMETRIC CONES
John H. Allen, Sr., Pasadena, and Orrin A. Wobig, Seabrook, Tex., assignors to the United States of America as represented by the Administrator of the National Aeronautics and Space Administration
Filed Dec. 28, 1965, Ser. No. 517,157
5 Claims. (Cl. 82—14)

The invention described herein was made by employees of the United States Government and may be manufactured and used by or for the Government for governmental purposes without the payment of any royalties thereon or therefor.

This invention relates to machine tools, and more particularly to a method and apparatus for machining geometrical cones on a machine lathe.

Geometrical cones of precise configuration are used for a wide variety and multitude of purposes. Elliptical cones, for example, are frequently required as models for aerodynamic surfaces which are to be subjected to wind tunnel tests, and the like. However, the fabrication of a geometrical cone having a cross section other than circular has heretofore been a very difficult and time consuming operation. One earlier method used for the fabrication of geometrical cones required the tedious fashioning of a handmade wooden pattern from which castings could then be made, if desired. The castings then had to be carefully ground and machined to desired dimensions. An alternative method using a cutting lathe for producing an elliptical cone required several machine operations to be performed on a suitable piece of stock material in which numerous elliptical station cuts were successively made on the stock. Careful grinding and handwork was then required to smooth the surface of the cone, with consequent inaccuracies. Furthermore, while machines have been devised which are capable of machining surfaces of revolution, these have been very elaborate, complex, and expensive forms of apparatus.

The method and apparatus of this invention which have been devised to overcome the limitations of prior techniques and apparatus are particularly useful in fabricating geometrical cones of precise configurations. By the method of this invention, the particular geometrical cone which is to be formed is preferably made from a selected workpiece of suitable stock material. A pattern cam having the same shape as the cross section of the desired geometrical cone is then mounted directly to one end of the workpiece, and the two are mounted on the lathe chuck and located thereon with their axes coincident with the lathe spindle axis.

A novel apparatus is also utilized which is mounted on the lathe and includes a cam follower placed in engagement with the edge of the pattern cam. The cam follower is carried on one end of an elongate slider bar which is mounted for lineal movement in the plane of the cam, and therefore perpendicular to the lathe spindle axis. Also connected to the slider bar is a tracer guide bar which is slidably and pivotally connected to a fixed point on the slider bar by a pin and slot connection. The tracer guide bar is also mounted at one end for pivotal movement about a pivot fixed relative to the lathe body, whereby rotation of the cam on the lathe spindle will cause the cam follower to follow its contour and the movements of the cam follower are translated by lineal movements of the slider bar to oscillatory pivotal movements of the tracer guide bar.

To commence the machining of the geometric cone, the tracing stylus of a conventional lathe tracer attachment is placed directly at the pivot of the tracer guide bar and a cutting tool mounted on the lathe cross slide is positioned with its cutting edge applied to the workpiece at its axis of rotation. As the pattern cam is rotated the lathe carriage is driven towards the workpiece, whereby the tracing stylus moves along a guiding surface provided along the center line of the tracer guide bar. The resulting oscillatory pivotal movements of the tracer guide bar caused by the in-and-out movement of the slider bar produces similar movements of the tracing stylus as it moves along the tracer guide bar. The cutting tool, as controlled by the lathe tracer attachment, then moves in correspondence with the tracing stylus to machine the workpiece to the form of a geometric cone with a cross sectional configuration corresponding to the shape of the pattern cam, and a taper which corresponds directly to the angular position of the tracer guide bar relative to the lathe spindle axis.

Figure 2:
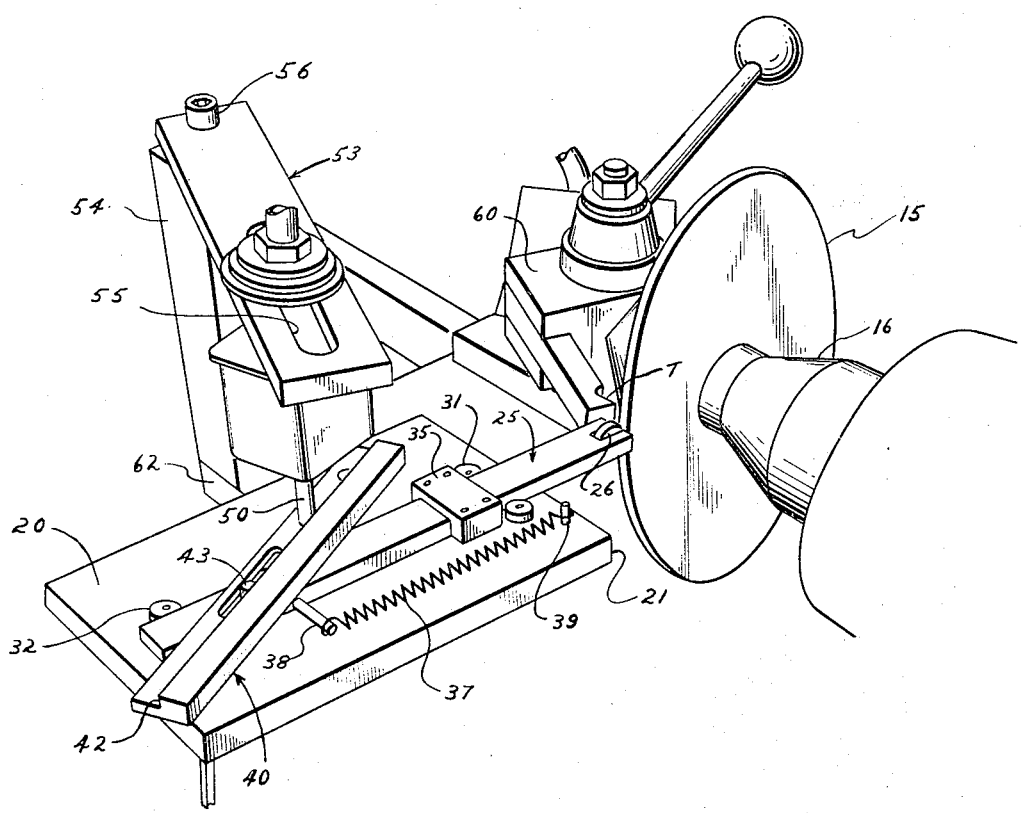

Other objects and many of the attendant advantages of this invention will be readily appreciated as the same become better understood by reference to the following detailed description when considered in connection with the accompanying drawings in which like reference numerals designate like parts throughout the figures thereof, and wherein:

FIG. 1 is a schematic plan view showing the apparatus of this invention as arranged on a lathe and used cooperatively therewith in machining a workpiece to the form of a geometrical cone; and FIG. 2 is a perspective view of an embodiment of the novel lathe attachment apparatus of this invention similar to that shown in FIG. 1.

Referring more particularly to the drawings, there is shown in FIG. 1 the novel apparatus of this invention as it is used with a lathe to machine a geometric cone, which for purposes of illustration will be described herein as used for the turning of an elliptical cone. A workpiece 10 of suitable stock material is selected, and an elliptical pattern cam 15 which is configured to the shape representing the desired cross section of the geometric cone to be machined is then affixed to the base of the workpiece in any suitable manner. The two pieces are then mounted on a lathe chuck to be adapted for rotation by the lathe spindle 16. As shown in FIG. 1, the cam and workpiece are centrally mounted with respect to the spindle axis, and with the cam disposed in a plane perpendicular to the spindle axis.

A novel lathe attachment apparatus is mounted on the lathe which comprises a support plate 20 mounted horizontally and parallel with the spindle axis on support posts, or the like, fixed to the lathe body. A slider bar 25 which carries a cam follower 26 at one end thereof is mounted for lineal sliding movement on the surface of the plate 20 and in the plane of the pattern cam 15. The slider bar is positioned between a pair of guide rollers 31 located near the front edge 21 of the plate and a similar pair of rollers 32 located near the opposite edge of the plate. The rollers of each pair engage the opposite sides of the slider bar and permit sliding lineal movement of the bar 25 in the plane of the cam and radially with respect to the spindle axis. Also fitted over the slider bar to prevent it from being raised from the support plate 20 is a U-shaped bracket 35 which is bolted or otherwise secured to the support plate 20. The bracket 35 does not clamp the slider bar, but is only loosely engaged therewith so as not to interfere with its sliding movement.

The cam follower 26 which is placed in engagement with the edge of cam 15 is in the form of a roller journalled for rotation on the yoked end of the slider bar. The cam follower is spring-biased into engagement with the edge of the cam 15 by means of a coiled spring 37 which is fixed at one end to an appendage 38 on one side of the slider bar, and at its other end to an anchor pin 39 located near the front edge of the plate.

Also mounted on the support plate 20 is a tracer guide bar 40 which is pivotally mounted near one end on a pivot post 41 fixed to the plate 20. The tracer guide bar 40 which is pivotally mounted near one end on a forms a guiding surface extending axially along the guide bar and coplanar with its pivot axis. The tracer guide bar is also slidably and pivotally connected to the slider bar 25 by a pin and slot connection wherein a pin 43 which protrudes from the upper surface of the slider bar is engaged in an elongate slot 44 in the tracer guide bar. It will therefore be seen that as the elliptical cam 15 is rotated on the lathe spindle, the cam follower follows the edge of the cam, whereby its movements, due to the variation in distance of the cam edge from the cam axis, are translated by lineal movements of the slider bar to oscillatory pivotal movements of the tracer guide bar.

In conjunction with the apparatus described above, the tracing stylus 50 of a conventional lathe tracer attachment is used with the tracer guide bar to control the movements of a cutting tool T when applied to the workpiece. In preparing the apparatus for a machining operation, the tracing stylus is placed against the tracer bar guide surface 42 directly at the pivot of the tracer bar 40. This location may be accurately determined by rotating the lathe spindle to produce oscillatory pivotal movement of the tracer guide bar. The stylus is then accurately placed at the pivot when there is no detectable movement of the stylus.

As best shown in FIG. 2, the tracing stylus 50 is carried on a support arm 53 which is adjustably and pivotally mounted at one end on an upright post 54 secured in fixed position on the cross-slide 62. The position of the tracing stylus is adjustable along the length of an elongate slot 55 which extends along the arm 53. A lock nut 56 is provided for locking the arm 51 in a selected angular position, and similar lock means is provided for locking the tracing stylus in a fixed position along the slot on the arm 53.

The cutting tool T is carried on a conventional tool post 60 such as the Model BX tool post which is a product of the Aloris Tool Co. The tool post is fixed on a compound slide 61 which in turn is suitably positioned at a fixed location on the lathe carriage cross-slide 62. The tool is positioned at a suitable cutting angle relative to the workpiece, with its cutting edge applied to the workpiece at a point coincident with the spindle axis and representing the vertex of the geometric cone.

The operation and function of the lathe carriage 63, the carriage cross-slide which is movable transversely thereon, and the compound slide are well known to those skilled in the art, so that further description of these parts is not deemed necessary. Further, the lathe tracer attachment which guides the cutting tool is of any conventional type such as one which includes a hydraulic ram fixed to the lathe carriage and operatively connected to the cross-slide to produce controlled lateral movements of the cross-slide, and therefore the cutting tool as the tracing stylus moves toward or away from the lathe spindle axis. For purposes of this invention, a lathe tracer attachment known as a 45° Air Gauge Tracer, which is a product of the Monarch Machine Tool Co., might be suitably employed. In this model the stylus pneumatically controls a hydraulic power unit which actuates the ram. Various other types of lathe tracer attachments could also be suitably used.

It will therefore be apparent that as the lathe carriage is driven towards the workpiece by either manual or automatic means, the tracing stylus 50 moves along the guide surface of the tracer guide bar, and the oscillatory pivotal movements of the tracer guide bar which are produced by the in-and-out movements of the cam follower will likewise be imparted to the tracing stylus. The cutting tool T, as controlled by the lathe tracer attachment, also moves in unison with the tracing stylus and cuts the surface of the workpiece to the form of an elliptical cone.

As shown in FIG. 1, it will be noted that the linear distance $Z_1$ of the tracing stylus 50 from the pivot of the guide bar is proportional to the distance $Z_2$ of the cutting tool edge from the vertex of the geometric cone. Also, the angular position $\alpha$ of the tracer guide bar from the reference line parallel to the lathe spindle axis is exactly equal to the semi-vertex angle B of the geometric cone at each point of its contact with the cutting tool and the distance $Y_1$ of the tracing stylus from the reference line is therefore equal to the distance $Y_2$ of the cutting tool edge from the axis of the cone.

Since an elliptical pattern cam is used in the illustration herein described, an elliptical cone is produced. This novel method and apparatus is, of course, readily adapted to the machining of other types of geometric cones. The only requirement is that a pattern cam be used which has the cross-sectional configuration of the geometric cone which is desired. The particular taper of the cone is, of course, determined by the selection of the angle $\alpha$ or the angular connection of the tracer guide bar with the slider bar.

From the above description it will be noted that this invention makes possible the machining of geometric cones to very close-tolerance configurations, even though they may be of unusual cross-section and taper. In the production of irregular shaped cones by this invention, a surface accuracy of $\pm.0005$ inch is usual. Furthermore, the apparatus by which it is achieved comprises an unusually simple and inexpensive attachment which may be mounted on any lathe and used in conjunction with a conventional lathe tracer attachment. By its simple mode of operation, the use of complex and expensive machinery or time consuming, costly hand operations becomes unnecessary.

If desired for purposes of facilitating the machining operation, the workpiece of bar stock material may be previously formed in conventional manner as a slightly oversized circular cone, larger than the cone which is to be made therefrom. The circular cone is mounted coaxially on the spindle and the cutting tool edge is placed at its vertex to commence the machining of a geometric cone. This may, of course, reduce the number of machining operations which may be required to machine the workpiece to its ultimate form as a geometric cone.

What is claimed and desired to be secured by Letters Patent is:

1. For use with a lathe comprising a rotary spindle and having a lathe carriage mounted for movement in the direction of the spindle axis and a cross-slide mounted on the lathe carriage for transverse movement relative thereto, a lathe attachment apparatus for machining geometric cones, said apparatus comprising:

a workpiece;

a pattern cam having the cross sectional configuration of the geometric cone which is to be machined, said cam and workpiece being mounted on the lathe spindle with the cam disposed coaxial with the spindle axis, whereby the cam and workpiece are rotatable by rotation of said spindle;

cam follower means disposed in engagement with the peripheral edge of the cam, whereby a reciprocating lineal motion will be imparted to the cam follower means by rotation of the cam;

a tracer bar guide mounted for pivotal movement about a pivot fixed with respect to the lathe body and slidably and pivotally connected to said cam follower means, whereby reciprocating lineal motion of the cam follower means imparted by rotation of the cam is converted to oscillatory pivotal movement of the tracer bar guide, said tracer bar guide having a straight guide surface thereon which is coplanar with the axis of said tracer bar pivot;

a tracing stylus fixedly mounted with respect to the lathe cross-slide and disposed in engagement with the guiding surface of said tracer bar guide, whereby the tracing stylus is adapted to follow said guide surface as the lathe carriage is driven towards the workpiece;

a cutting tool mounted on the cross-slide and positioned with its cutting edge applied to the workpiece at the rotary axis thereof; and lathe tracer attachment means for moving said cutting tool in direct correspondence with the movement of said tracing stylus whereby as the lathe carriage is moved towards the workpiece, it is machined by the cutting tool to the form of a geometric cone having a cross sectional configuration corresponding to the shape of the pattern cam and a taper which corresponds to the angular position of the tracer guide bar relative to the lathe spindle axis.

2. A lathe attachment apparatus as defined in claim 1 wherein said cam follower means comprises an elongate slider bar mounted on the lathe for sliding lineal movement in a direction perpendicular to the lathe spindle axis, said slider bar having a roller journalled for rotation on one end of the slider bar and disposed in engagement with the edge of said cam whereby rotation of the cam imparts a reciprocating lineal motion to the slider bar and oscillatory pivotal movement of the tracer bar guide.

3. For use with a lathe comprising a rotary spindle and having a lathe carriage mounted for movement in the direction of the spindle axis and a cross-slide mounted on the lathe carriage for transverse movement relative thereto, an apparatus for machining geometric cones, said apparatus comprising:

a pattern cam having the cross sectional configuration of the geometric cone which is to be machined, said cam being mounted on the lathe spindle in coaxial relationship and adapted to be rotated therewith;

cam follower means disposed in engagement with the peripheral edge of the cam, whereby a reciprocating lineal motion is impartable to the cam follower means by rotation of the cam;

means for translating the reciprocating lineal motion of the cam follower means to oscillatory pivotal movement, said means comprising a tracer bar guide which is mounted for pivotal movement about a pivot fixed with respect to the lathe body and is slidably and pivotally connected to said cam follower means, said tracer bar guide having a straight guide surface thereon which is coplanar with the tracer bar pivot axis;

a tracing stylus disposed in engagement with the guiding surface of said tracer bar guide, means for fixedly mounting said tracing stylus with respect to the lathe cross-slide whereby the tracing stylus follows said guide surface as the lathe carriage is driven towards said workpiece;

a cutting tool mounted on the cross-slide and adapted to be applied to a workpiece at the rotary axis thereof when the workpiece is also mounted on said spindle; and lathe tracer attachment means for moving said cutting tool in direct correspondence with movements of said tracing stylus when the lathe carriage is driven towards said cam and the spindle is rotated whereby when the cutting tool is applied to a workpiece mounted on the spindle at the rotary axis thereof, the workpiece is machined to the form of a geometric cone having a cross sectional configuration corresponding to the shape of the pattern cam and a taper which corresponds directly to the angular position of the tracer guide bar relative to the lathe spindle axis.

4. A lathe attachment apparatus as defined in claim 3 wherein said cam follower means comprises an elongate slider bar mounted on the lathe for sliding lineal movement in a direction perpendicular to the lathe spindle axis, said slider bar having a roller journalled for rotation on one end of the slider bar and disposed in engagement with the edge of said cam whereby rotation of the cam imparts a reciprocating lineal motion to the slider bar and oscillatory pivotal movement of the tracer bar guide.

5. For use with a lathe comprising a rotary spindle and having a lathe carriage mounted for movement in the direction of the spindle axis and a cross-slide mounted on the lathe carriage for transverse movement relative thereto, an apparatus for machining geometric cones, said apparatus comprising:

a pattern cam having the cross sectional configuration of the geometric cone which is to be machined, said cam being mounted on the lathe spindle in coaxial relationship and adapted to be rotated therewith; and cam follower means disposed in engagement with the peripheral edge of the cam, whereby a reciprocating lineal motion is impartable to the cam follower means by rotation of the cam;

means for translating the reciprocating lineal motion of the cam follower means to oscillatory pivotal movement, said means comprising a tracer bar guide which is mounted for pivotal movement about a pivot fixed with respect to the lathe body and is slidably and pivotally connected to said cam follower means, said tracer bar guide having a straight guide surface thereon which is coplanar with the tracer bar pivot axis whereby the tracing stylus of a lathe tracer means may be fixedly mounted on the lathe cross-slide and disposed in tracing engagement with said guide surface to control the movements of a cutting tool when applied to a workpiece mounted for rotation on the lathe spindle and thereby machine the workpiece to the form of a geometric cone as the carriage is driven towards the spindle and the spindle is rotated.

References Cited

UNITED STATES PATENTS

| | | |
|---|---|---|
| 2,681,595 | 6/1954 | Le Compte. |
| 2,706,426 | 4/1955 | Kelley. |
| 3,024,684 | 3/1962 | Stratman. |
| 3,040,607 | 6/1962 | Bulliet. |
| 3,066,560 | 12/1962 | Estephanio. |
| 1,933,798 | 11/1933 | Gebers _____ 82—14 |
| 2,720,130 | 10/1955 | Chang _____ 82—19 |

FOREIGN PATENTS 519,619   3/1955   Italy.

GERALD A. DOST, *Primary Examiner.*